(12) United States Patent
Eschenroeder et al.

(10) Patent No.: US 7,703,106 B2
(45) Date of Patent: Apr. 20, 2010

(54) DISCOVERING AND MONITORING PROCESS EXECUTIONS

(75) Inventors: Klaus Eschenroeder, Karlsruhe (DE); Sigo Henkel, Heidelberg (DE); Dieter Schwab, Wiesloch (DE); Tzvetomir M. Vassilev, Frankfurt (DE)

(73) Assignee: SAP Aktiengesellschaft, Walldorf (DE)

( * ) Notice: Subject to any disclaimer, the term of this patent is extended or adjusted under 35 U.S.C. 154(b) by 1184 days.

(21) Appl. No.: 10/727,104

(22) Filed: Dec. 2, 2003

(65) Prior Publication Data

US 2005/0120357 A1 Jun. 2, 2005

(51) Int. Cl.
*G06F 3/00* (2006.01)
*G06F 9/44* (2006.01)
*G06F 9/46* (2006.01)
*G06F 13/00* (2006.01)

(52) U.S. Cl. .................. 719/320; 719/318; 719/319; 717/127; 717/131

(58) Field of Classification Search ......... 717/127–131; 719/310–320, 328–332; 705/1; 718/100–198
See application file for complete search history.

(56) References Cited

U.S. PATENT DOCUMENTS

| | | | |
|---|---|---|---|
| 6,633,908 B1 * | 10/2003 | Leymann et al. | 709/224 |
| 6,671,830 B2 * | 12/2003 | Lowell et al. | 714/39 |
| 6,721,941 B1 * | 4/2004 | Morshed et al. | 717/127 |
| 6,965,806 B2 * | 11/2005 | Eryurek et al. | 700/96 |
| 7,171,670 B2 * | 1/2007 | Motoyama et al. | 719/310 |
| 2002/0078382 A1 * | 6/2002 | Sheikh et al. | 713/201 |
| 2002/0143911 A1 * | 10/2002 | Vicente et al. | 709/223 |
| 2002/0194251 A1 * | 12/2002 | Richter et al. | 709/105 |
| 2004/0078796 A1 * | 4/2004 | Utsumi | 718/105 |
| 2005/0055350 A1 * | 3/2005 | Werme et al. | 707/10 |
| 2006/0085798 A1 * | 4/2006 | Bendiksen et al. | 719/318 |
| 2006/0168594 A1 * | 7/2006 | Deverill et al. | 719/318 |

OTHER PUBLICATIONS

Haworth, Service Management Using the Application Response Measurement API Without Application Source Code Modification, Jun. 1997, pp. 1-7.*
Johnson, The Application Response Muasurement (ARM) API, Version 2, Tivoli Systems, Dec. 1997, pp. 1-14.*
The Open Group, Systems Management Application Response Measurement (ARM) API, 1998, pp. i-xii and 1-25.*
Alonso et al, WISE: Business to Business E-Commerce, IEEE, Mar. 1999, pp. 1-8.*
Flasinski, Automata-Based Multi-agent Model as a Tool for Constructing Real-Time Inteliggent Control Systems, Springer-Verlag Berlin Heidelberg, 2002, pp. 101-110.*
Gao et al, Monitoring Software Components and Component-Based Software, IEEE, 2000, pp. 1-13.*

* cited by examiner

*Primary Examiner*—Diem K Cao
(74) *Attorney, Agent, or Firm*—Fish & Richardson P.C.

(57) ABSTRACT

Methods and apparatus, including computer program products, for monitoring and discovering process executions in a distributed computer system. A central system receives process data items that have been collected by an agent, identifies a process instance with which each process data item is associated, groups the process data items that are associated with a first process instance into a first group, and generates a reconstruction of the first process instance based on the process data items in the first group. The central system can further use the reconstructed first process instance to model a process. Additionally, the central system can further use the reconstructed first process instance to monitor a process instance.

22 Claims, 10 Drawing Sheets

DISCOVERING AND MONITORING PROCESS EXECUTIONS

BACKGROUND

The present invention relates to data processing by digital computer, and more particularly to discovering and monitoring process executions.

Companies and organizations typically use one or more processes that are performed, either in whole or in part, in a system of computers. Such processes typically consist of one or more discrete tasks directed to producing one or more results. The system of computers can consist of multiple computers, each with one or more components. A component may be a software component, such as an application program, or a hardware component, such as a barcode scanner or a radio frequency identification receiver. A component in the system may have one or more interfaces for exchanging information with other components and computers. Further, the system of computers may be a distributed system, in which at least one computer is located in an area physically removed from another computer, such as a different room, building, city, or country. For example, a company may use a computer in a warehouse and a computer in an office building to perform different portions of one process.

Executing a process using components that operate on a distributed computer system can provide substantial benefits, such as the ability to share computing resources. However, it can also make discovering information about and monitoring a process execution difficult or even impossible.

SUMMARY OF THE INVENTION

The present invention provides methods and apparatus, including computer program products, for discovering and monitoring process executions.

In general, in one aspect, the invention provides methods and apparatus, including computer program products, for discovering and monitoring process executions. A program according to this aspect has instructions operable to receive process data items that have been collected by an agent, identify a process instance with which each process data item is associated, group the process data items associated with a first process instance into a first group, and generate a reconstruction of the first process instance based on the process data items in the first group.

Advantageous implementations of the invention include one or more of the following features. The operations for discovering and monitoring process executions can further comprise modeling a process based on the reconstruction of the first process instance. The modeling of a process based on the reconstruction of the first process instance can further comprise generating a reconstruction of a second process instance based on the process data items in a second group and further modeling the process based on the reconstruction of the second process instance.

The operations for discovering and monitoring process executions can also further comprise monitoring a process instance based on the reconstruction of the first process instance. The monitoring of a process instance based on the reconstruction of the first process instance, wherein the process data items are collected by the agent upon the occurrence of a predetermined condition, can further comprise modifying the predetermined condition. The monitoring of a process instance, wherein the process data items have a first type can further comprise specifying a second type of process data item for the agent to collect.

The monitoring of a process instance, wherein the agent is associated with a first tracking point can further comprise specifying a second tracking point with which to associate the agent. The monitoring of a process instance, wherein the agent is associated with a first tracking point can further comprise specifying a second tracking point with which to associate a second agent.

The operations for discovering and monitoring process executions can further comprise receiving additional process data items collected by a second agent, identifying a process instance with which each additional process data item is associated, and grouping the additional process data items that are associated with the first process instance with the first group.

A program according to another aspect has instructions operable to receive a specification of a predetermined condition, collect process data items associated with a component upon the occurrence of the predetermined condition, and transfer the process data items to a central system operable to reconstruct a process instance based on the process data items.

Advantageous implementations of the invention include one or more of the following features. The operations for collecting process data items upon the occurrence of a predetermined condition can further comprise collecting the process data items without modifying the component. The operations for collecting process data items can also further comprise receiving a specification of a second predetermined condition and collecting additional process data items associated with the component upon the occurrence of the second predetermined condition. The operations for collecting process data items can also further comprise receiving a specification of a second component, collecting other process data items associated with the second component upon the occurrence of another predetermined condition, and transferring the other process data items to the central system.

The invention can be implemented to realize one or more of the following advantages. The systems and techniques described herein can be used to discover information about a process or process instance (e.g., for monitoring or modeling purposes) where the process has not been modeled and where the execution sequence of the process instance may not be known. Such information can be collected without requiring process execution to be controlled by a central process engine or requiring the participating components to pass a process identifier. Therefore, process execution can be carried out more efficiently and reliably. The ability to monitor a plurality of components participating in the execution of a process instance in a distributed system is also advantageous in that conclusions can be drawn regarding the complete process, even in circumstances where the process has not been modeled. One implementation of the invention provides all of the above advantages.

The details of one or more implementations of the invention are set forth in the accompanying drawings and the description below. Further features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

The systems and techniques described herein relate to the discovery and monitoring of process flows and process executions. As used herein, the term "process" (e.g., a business process) means a sequence of related steps carried out to achieve a specific purpose (e.g., a business purpose). The terms "process instance" and "instance of a process" mean a single execution of a process, including an execution that has not yet terminated. As used herein, the term "process flow" means the sequence of steps carried out during a process execution. As used herein, the term "process data stream" means information, including system-relevant information and process-relevant information, associated with a process instance. As used herein, the term "process data item" means one or more items of information in the process data stream.

Figure 1:
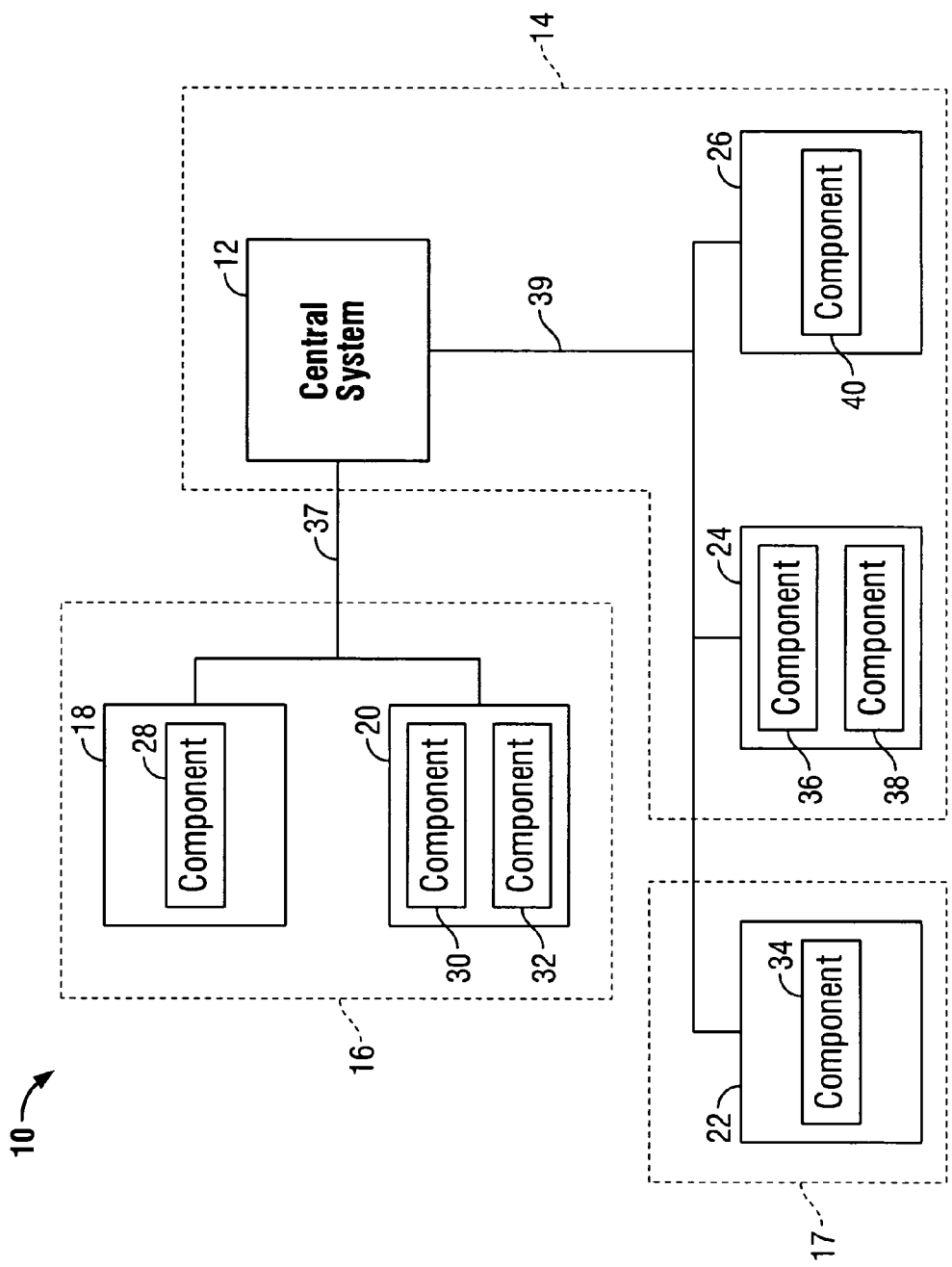
FIG. 1 is a block diagram of a system of distributed computers.

As shown in FIG. 1, a distributed computer system 10 includes one or more computers in multiple locations 14, 16, and 17. In the distributed computer system 10, a first location 14 includes a central system 12 and computers 24 and 26. A second location 16 includes computers 18 and 20, and a third location 17 includes only a single computer 22. The distances by which these different locations are separated is not material.

The distributed computer system 10 also includes components, each of which may be involved in the execution of one or more processes. In location 14, components 36 and 38 are executed on computer 24 and component 40 is executed on computer 26. In location 16, component 28 is executed on computer 18 and components 30 and 32 are executed on computer 20. In location 17, component 34 is executed on computer 22. For software components, each component can be a discrete software application, or a module within a larger software application or system. The distributed computer system 10 also includes communications channels 37 and 39 that permit communication between the computers. Communications channels 37 and 39 may be implemented using any known data communications means.

Figure 2:
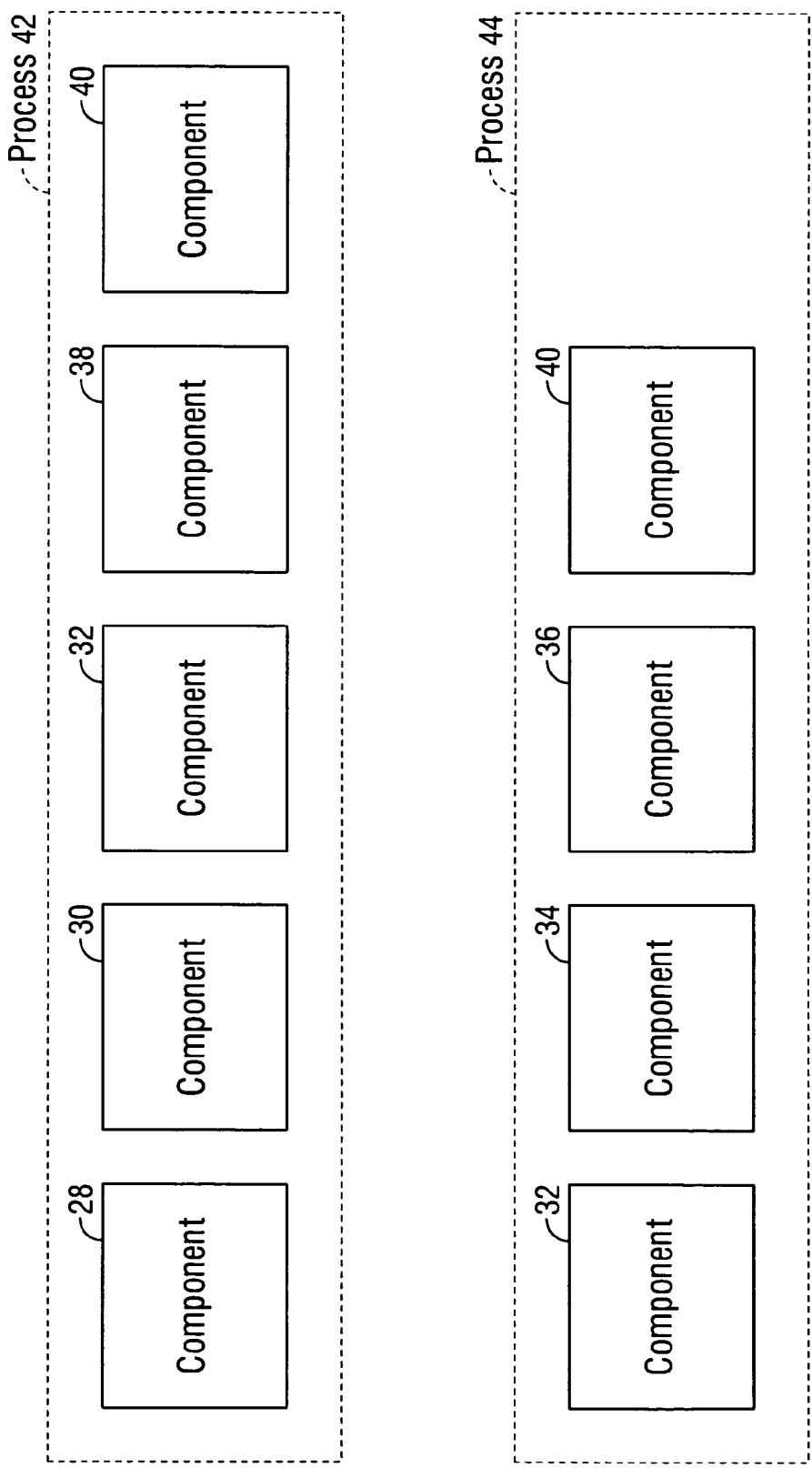
FIG. 2 is a block diagram showing components associated with the execution of different processes.

FIG. 2 depicts components logically associated with two separate processes executing in the distributed computer system 10. Components 28, 30, 32, 38 and 40 are associated with a process 42. Components 32, 34, 36 and 40 are associated with a process 44. It is not necessary for a component to be associated with the execution of every instance of the process with which it is associated. During the execution of a process instance, a condition arising from the execution of one component may obviate the need to involve one or more remaining components. Further, it is not detrimental if a component initially associated with a process is not truly associated with any instance of that process, as subsequent analysis of reconstructed instances of a process will identify which components are actually associated with that process.

Figure 3:
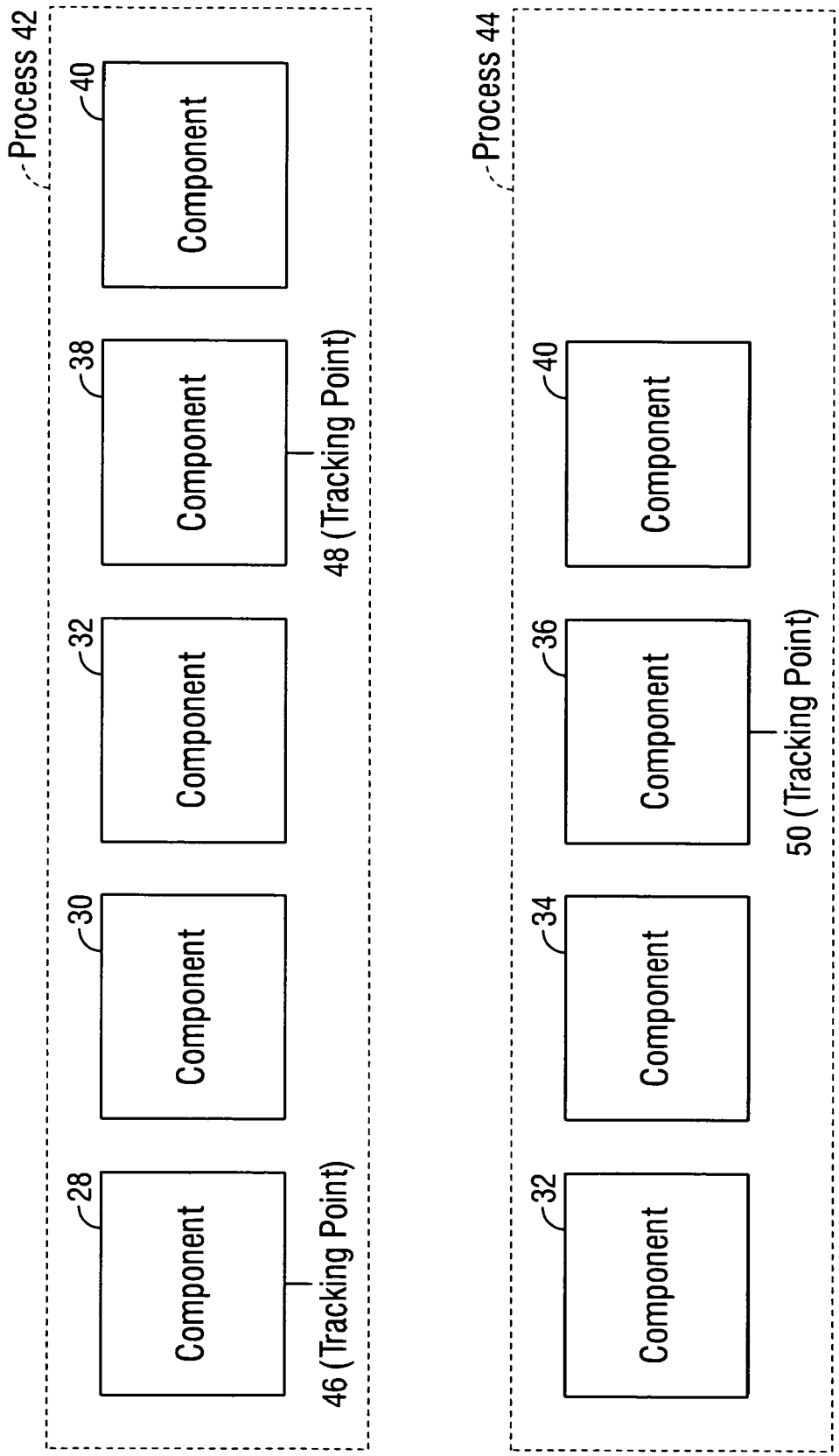
FIG. 3 is a block diagram showing tracking points in a plurality of components.

Although the flow of a process executing in a distributed computer system may not be known, it is often possible to identify the components that are, or are likely to be, associated with the process. It may also be possible to identify one or more tracking points in those components that represent points in the execution of a process at which one or more data items relevant to process discovery or process monitoring may be available. FIG. 3 demonstrates the identification of tracking points 46, 48, and 50 in components 28, 38, and 36 respectively. Each tracking point represents a component, or a portion thereof, at which it may be possible to access one or more process data items.

Figure 4:
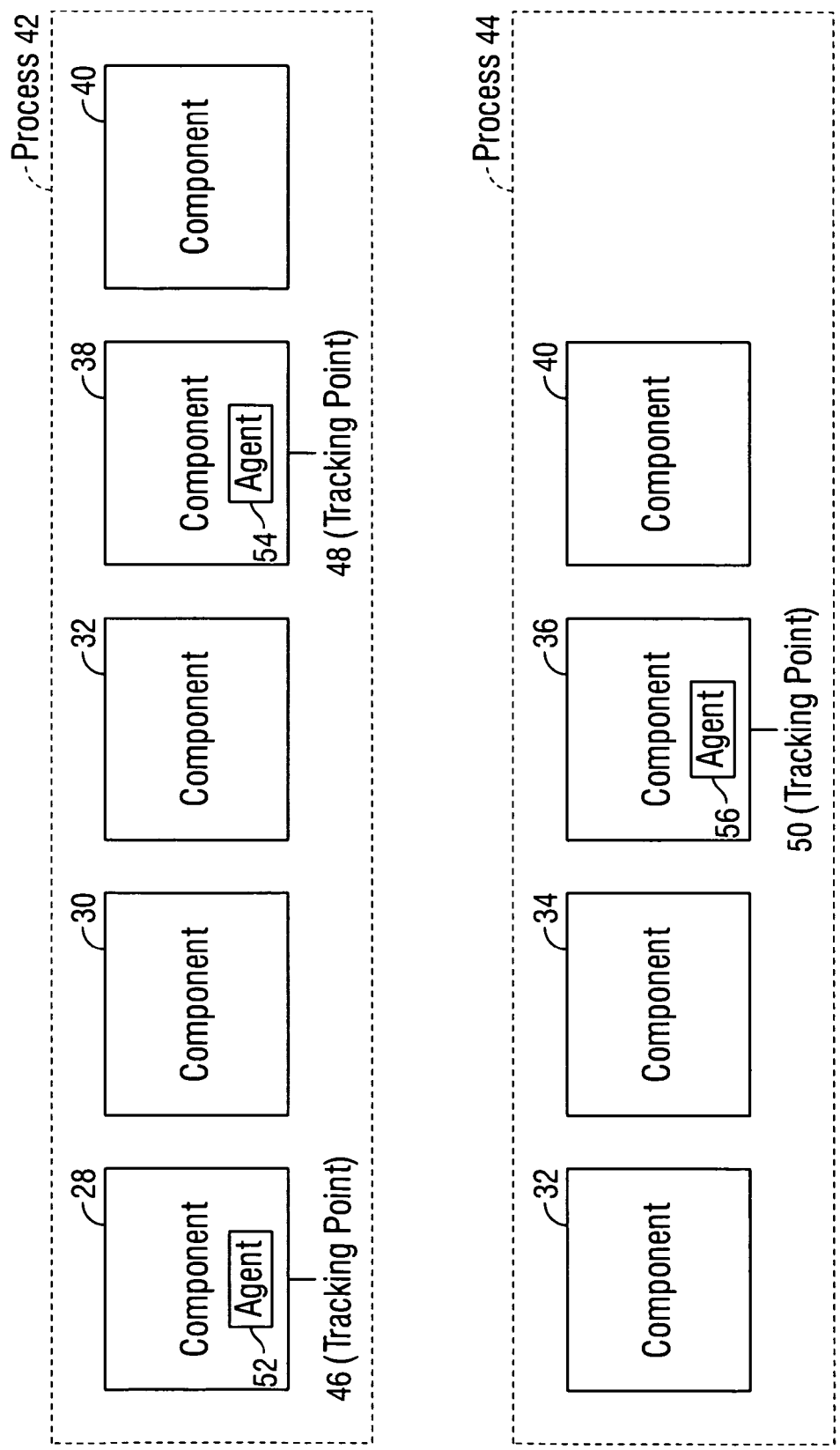
FIG. 4 is a block diagram showing agents integrated with a plurality of components.

Once one or more tracking points have been identified in the components of the distributed computer system 10, an agent can be associated with each tracking point. In one implementation, each agent is assigned an identifier, which is unique to that agent within the distributed computer system 10. The unique identifier allows the central system 12 to locate and communicate with a particular agent in the distributed computer system 10. FIG. 4 demonstrates the association of an agent 52 with a tracking point 46 in a component 28, and the association of an agent 54 with a tracking point 48 in a component 38. In the example in FIG. 4, components 28 and 38 are associated with process 42. Additionally, FIG. 4 shows the association of an agent 56 with tracking point 50 in component 36, which is associated with process 44.

In one implementation, it is possible to associate an agent with a component without modifying the component. For example, agents 52, 54, and 56 can be associated with components 28, 38, and 36 by integrating the agents with the components. In order to integrate an agent with a component, the component must include one or more interfaces that permit communication of one or more items of information to the agent.

Figure 5:
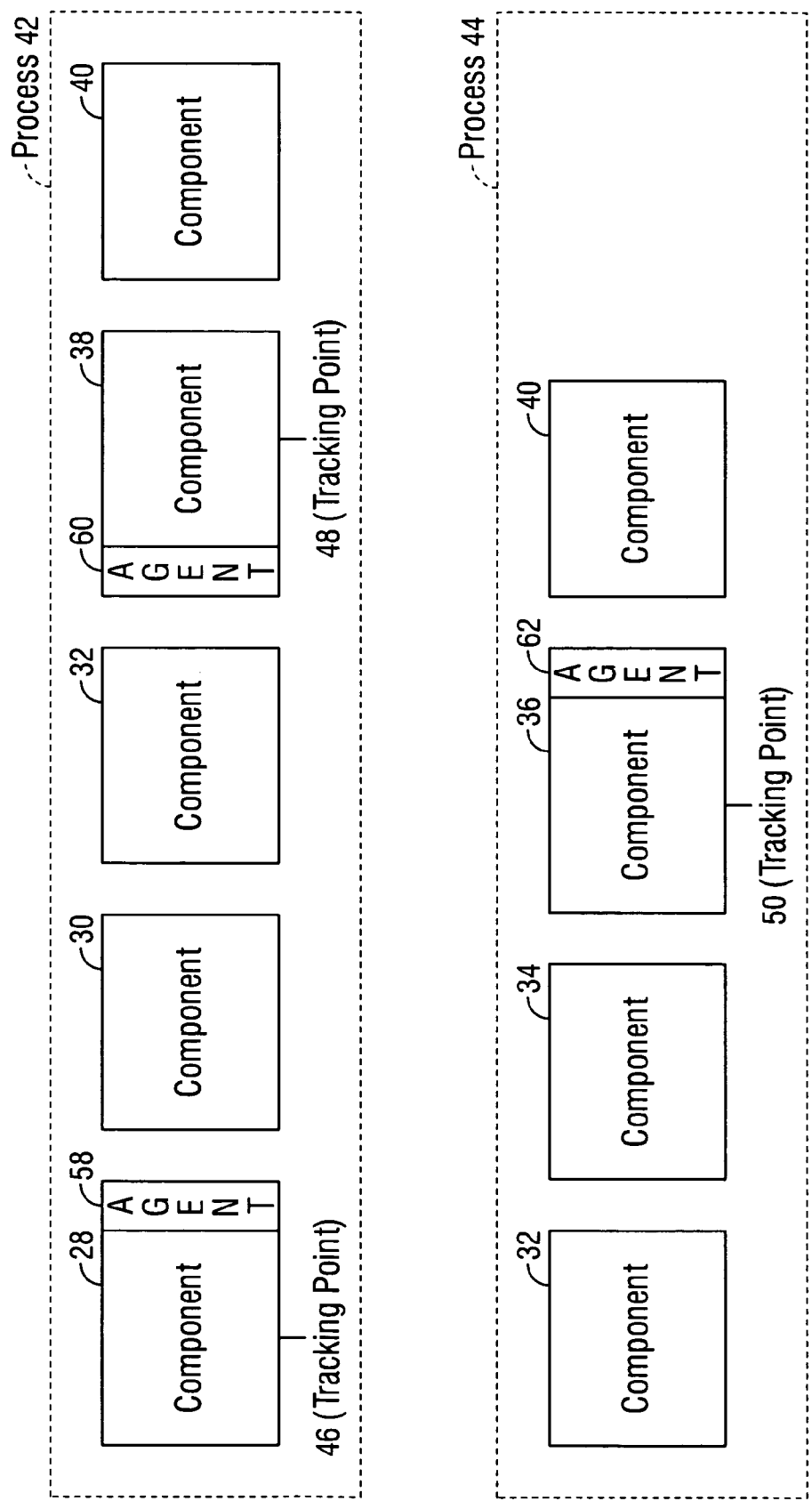
FIG. 5 is a block diagram showing agents associated with a plurality of components.

An agent can also be associated with a component in other manners. For example, in FIG. 5, as in FIG. 4, components 28, 38, and 36 have been identified as having tracking points 46, 48, and 50 respectively. Additionally, as in FIG. 4, agents 58, 60, and 62 are associated with these tracking points. However, instead of integrating the agents 58, 60, and 62 with the components 28, 38, and 36, the agents are associated with one or more of the interface points the components use for communication. For example, in FIG. 5, the agents 58 and 62 are shown associated with interface points representing the output of the components 28 and 36 respectively. In this scenario, the agents 58 and 62 will have access to the data items that are output from the components 28 and 36, respectively. Alternatively, an agent 60 is shown associated with an interface point representing the input of a component 38. Accordingly, the agent 60 will have access to the data items that serve as input to the component 38. Instead of monitoring an interface point, an agent may also monitor the communications path used by a component, thereby allowing the agent to monitor the process data stream without interacting with the component. An agent may be associated with a component in such a manner that both the agent and the component have equivalent access to the process data stream.

As described above, an agent can be associated with a component at a point at which it is believed one or more process data items may be collected during the execution of a process instance. Once an agent has been associated with a component, the agent can then monitor the process data stream at that software component.

Each agent can be configured to collect one or more types of process data items upon the occurrence of a predetermined condition. For example, an agent can be configured to collect, upon the occurrence of a predetermined condition, a first type of process data item consisting of an order number and a delivery date. The same agent may also be configured to collect, upon the occurrence of the same predetermined condition, a second type of process data item consisting of a customer number, the system time, and the system date. It should be clear from the preceding example that a process data item may consist of any information in the process data stream. An agent can also be configured to collect process data items upon the occurrence of more than one predetermined condition.

Any value, signal, or state that can be received or determined by an agent may serve as a predetermined condition. For example, an agent's predetermined condition may be the detection of a specific customer identification number in the process data stream. An agent's predetermined condition may be set or modified both before and after the agent is associated with a component. This facilitates refinement of the process identification and monitoring functions within the distributed computer system 10. In one implementation, the central system 12 can be used to set, modify and track the predetermined conditions for the agents. As mentioned above, in one implementation, the central system 12 can communicate with one or more specific agents using the unique identifier assigned to each agent. The predetermined conditions may also be set, modified, or tracked by an administrator or through other known methods.

Once an agent identifies the occurrence of a predetermined condition, the agent can collect one or more process data items from the process data stream. The process data items are collected in a non-destructive manner, so that the process data stream remains unaltered. For example, an agent may collect a process data item by simply creating a copy of it. At some time following collection, the process data items are transferred to the central system 12. In addition to transferring the collected process data items, an agent's unique identifier may also be transferred to the central system 12. Transferring an agent's unique identifier with a process data item allows the central system 12 to determine the location at which the process data item was collected.

The types of process data items that an agent is configured to collect upon the occurrence of a predetermined condition may also be set or modified both before and after the agent is associated with a component. This also facilitates refinement of the process identification and monitoring functions within the distributed computer system 10. In one implementation, the central system 12 can be used to set, modify and track the types of process data items an agent is configured to collect. As mentioned above, in one implementation, the central system 12 can communicate with one or more specific agents using the unique identifier assigned to each agent. The types of process data items an agent is configured to collect may also be set, modified, or tracked by an administrator or through other known methods.

Figure 6:
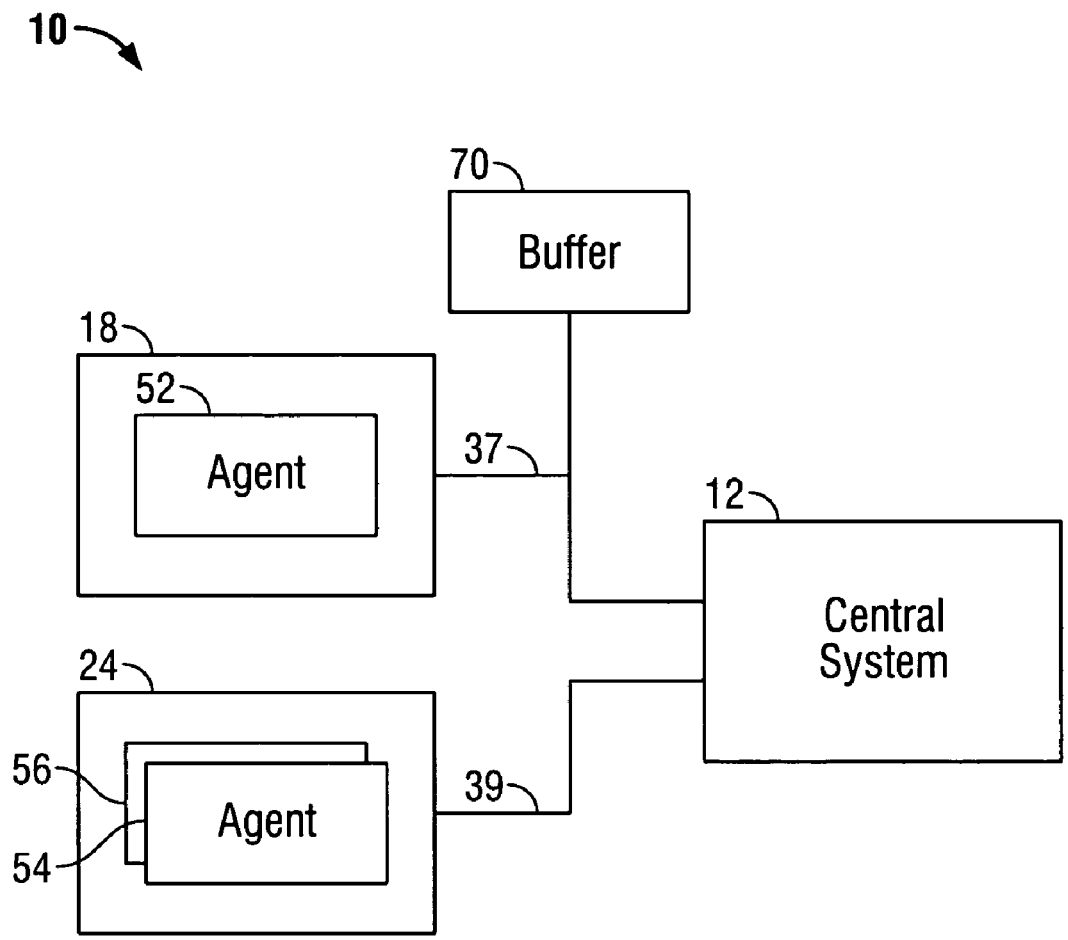
FIG. 6 is a block diagram showing two computers and a central system.

FIG. 6 shows computers 18 and 24 of the distributed computer system 10, wherein the computers are connected to the central system 12 by communications channels 37 and 39. Each of the computers 18 and 24 includes one or more agents. Agent 52 is located on computer 18, and is associated with a component. Agents 54 and 56 are located on computer 24, and are similarly associated with components. After an agent collects a process data item, the process data item can be transferred to the central system 12.

A transfer may be initiated by the agent at some point after a process data item is collected. For example, the agent may initiate the transfer based upon the passing of a predetermined time period, the collection of a predetermined number of process data items, or the consumption of a predetermined percentage of its resources. Alternatively, the transfer may be initiated by a command received by the agent from the central system 12, instructing the agent to transfer the process data items it has collected since the previous transfer. In one implementation, the agent may be configured to transfer the collected process data items to a separate buffer 70 that serves as an intermediary between the agent and the central system 12. The use of a buffer 70 can free the agent from involvement in the data transfer process and allow the agent to be implemented using fewer resources.

Figure 7:
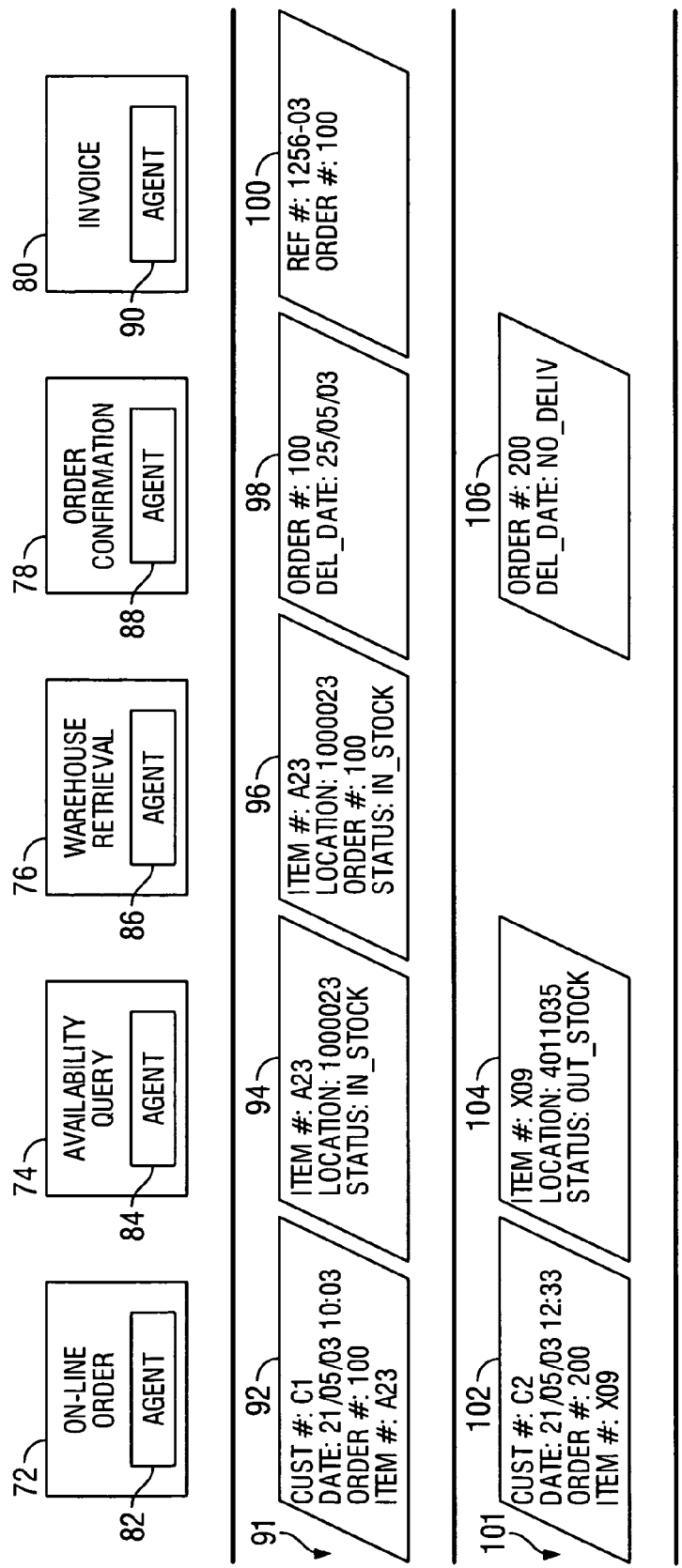
FIG. 7 is a block diagram showing the components and agents associated with those components.

As an example, the collection of process data items will now be described in the context of a process for taking and fulfilling on-line orders. FIG. 7 shows the process organized as five separate steps. The five steps correspond to five software components, each designed to accomplish one or more tasks associated with the overall process. For each step, information that is useful for process discovery and monitoring has been identified so that corresponding process data items may be collected during the execution of an instance of the process.

The first step of the process is performed by the software component "On-line Order" 72, which accepts a customer's order submitted using the Internet. An agent 82 is associated with the software component 72. During the execution of a process instance the agent 82 collects, upon the occurrence of a predetermined condition, a process data item corresponding to the customer number, date and time, order number, and item number associated with an order.

The second step of the process is performed by the software component "Availability Query" 74, which determines whether an ordered item is in stock. An agent 84 is associated with software component 74. During the execution of a process instance the agent 84 collects, upon the occurrence of a predetermined condition, a process data item corresponding to the item number, location, and stock status.

The third step of the process is performed by the software component "Warehouse Retrieval" 76, which initiates retrieval of an ordered item from a warehouse. An agent 86 is associated with the software component 76. During the execution of a process instance the agent 86 collects, upon the occurrence of a predetermined condition, a process data item corresponding to the item number, location, order number, and stock status.

The fourth step of the process is performed by the software component "Order Confirmation" 78, which confirms the filling of an order. An agent 88 is associated with the software component 78. During the execution of a process instance the agent 88 collects, upon the occurrence of a predetermined condition, a process data item corresponding to the order number and delivery date.

The fifth step of the process is performed by the software component "Invoice" 80, which generates an invoice corresponding to an order. An agent 90 is associated with the software component 80. During the execution of a process instance the agent 90 collects, upon the occurrence of a predetermined condition, a process data item corresponding to the invoice reference number and order number.

Continuing with the example, FIG. 7 also demonstrates the collection of process data items, by the agents, from process instances 91 and 101. In a first instance 91, an on-line order is initiated and a process data item 92 is collected by the agent 82. Specifically, the process data item 92 indicates that customer C1 initiated order 100 by requesting item A23 at 10:03 on May 21, 2003.

The stock status of the requested item is determined in step two of the process instance 91, which is carried out by the software component "Availability Query" 74. During this step, a process data item 94 is collected by the agent 84. Specifically, the process data item 94 indicates that item A23 is determined to be at location 1000023 and that the stock status is In_stock.

Because the stock status is In_stock, the process instance 91 proceeds to step three, in which the software component "Warehouse Retrieval" 76 retrieves the requested item from the warehouse. During this step, a process data item 96 is collected by the agent 86. Specifically, the process data item 96 indicates that stock status remains In_stock, and that item A23 is retrieved from location 1000023 and is associated with order number 100.

The process instance 91 then proceeds to step four, performed by the software component "Order Confirmation" 78, in which the action of filling of the customer's order is confirmed. During this step, a process data item 98 is collected by the agent 88. Specifically, the process data item 98 indicates that order number 100 is associated with a delivery date of May 25, 2003.

Because order number 100 was filled, the process instance 91 proceeds to step five, in which an invoice for the order is generated by the software component "Invoice" 80. During this step, a process data item 100 is collected by the agent 90. Specifically, the process data item 100 indicates that the invoice corresponding to order number 100 is identified by the reference number 1256-03. While this step represents the final step of the process instance 91, further steps may be performed in other implementations, either before, between, or after the five steps set forth above. Such steps may include manual as well as automated steps that either are not executed by a component in the distributed computer system or have not been associated with an agent.

FIG. 7 also describes the execution of a second process instance 101. The process data items collected during the second process instance 101 differ from those collected during the first process instance 91, and the process instance is characterized by a different process flow. In the second process instance 101, an on-line order is initiated and a process data item 102 is collected by the agent 82. Specifically, the process data item 102 indicates that customer C2 initiated order 200 by requesting item X09 at 12:33 on May 21, 2003.

The stock status of the requested item, item X09, is determined in step two of the process instance 101, which is executed by the software component "Availability Query" 74. During this step, a process data item 104 is collected by the agent 84. Specifically, the process data item 104 indicates that location 4011035 does not presently contain item X09 and the stock status is set to Out_stock.

Because the stock status is Out_stock, the process instance 101 skips step three and proceeds to step four, which is executed by the software component "Order Confirmation" 78. During this step, a process data item 106 is collected by the agent 88. Specifically, the process data item 106 indicates that no delivery date is established for order number 200. The process instance 101 therefore demonstrates that not all of the components associated with a process will be involved in the execution of every instance of that process.

A reconstructed process instance, made up of process data items that have been sequenced as described below, provides information describing events that have occurred in the execution of that process instance. The central system 12 can reconstruct a process instance from the process data items, corresponding to the process instance, that have been received by the central system 12 up to the time of reconstruction. As described above, a user can identify the process data items that will provide the information the user would like to know about the process. If the user determines, after the reconstruction of one or more process instances, that the desired process data items are not being collected, one or more of the agents associated with that process can be modified. A new agent can be added or an existing agent can be relocated or disassociated from the process if the desired information is not being collected. A predetermined condition of an agent and the types of process data items collected upon the occurrence of that predetermined condition can also be modified.

Figure 8:
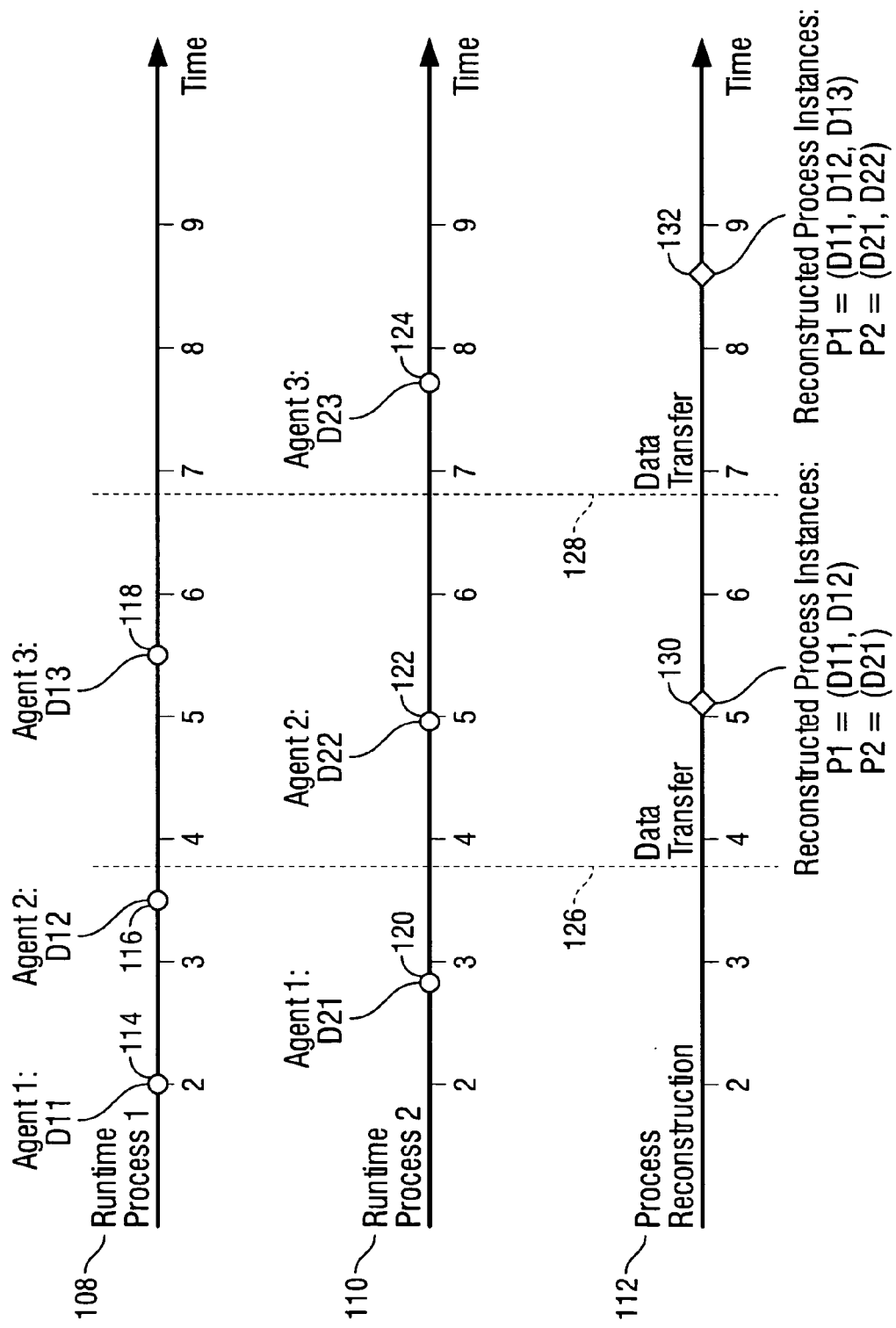
FIG. 8 is a series of related timelines demonstrating the collection of process data items and the transfer of the process data items to a central system.

The transfer of data from an agent to the central system and reconstruction of a process instance is illustrated in FIG. 8, which depicts three distinct timelines 108, 110, and 112. The top timeline 108 corresponds to the execution of an instance of process 1, the middle timeline 110 corresponds to the execution of an instance of process 2, and bottom timeline 112 corresponds to the reconstruction of the instances of processes 1 and 2.

While the instances of processes 1 and 2 are executing, agents 1, 2, and 3 collect process data items from the corresponding process data streams. As described above, agents 1, 2, and 3 can collect process data items from both process instances upon the occurrence of one or more predetermined conditions. The agents need not be concerned with the identity of the process instance from which a process data item is collected. In the example in FIG. 8, a process data item D11 is collected at a first point in time 114. The process data item descriptor "D11" represents one or more data items D collected from process 1 by agent 1. A process data item D21 is collected at a second point in time 120. The process data item descriptor "D21" represents one or more data items D collected from process 2 by agent 1. As the process instances execute, agents 2 and 3 collect additional process data items D12, D22, D13, and D23 at subsequent points in time 116, 122, 118, and 124 respectively.

The dashed lines in FIG. 8 indicate the transfer of process data items to the central system 12. After the first data transfer 126, the central system 12 reconstructs the instances of processes 1 and 2 at a first reconstruction point in time 130. As discussed above, process reconstruction by the central system 12 can only be performed using the process data items received by the central system 12 prior to the time of reconstruction. Therefore, although process data item D22 is collected at a point in time 122 before the first reconstruction of the instance of process 2, process data item D22 is not included in that reconstruction. As a result, the instance of process 1 is reconstructed using the process data items D1 and D12, which are transferred to the central system 12 prior to the first reconstruction. Similarly, the instance of process 2 is reconstructed using only process data item D21.

The instances of processes 1 and 2 are once again reconstructed at a second reconstruction point in time 132. Again, although process data item D23 is collected at a point in time 124 prior to the second reconstruction, it is not included in the reconstruction because there are no data transfers after process data item D23 is collected and before the second reconstruction occurs. Therefore, at the second reconstruction point in time 132, the reconstructed instance of process 1 consists of data items D11, D12, and D13, and the reconstructed instance of process 2 consists of data items D21 and D22. The discovery and monitoring of process flows and process executions through process reconstruction can be made to approach real-time (i.e., to represent the current status of the process instances) if data transfer occurs very close in time to data collection.

In order for the central system 12 to reconstruct a process, it must be able to determine which process data items are associated with a particular process instance. To make this determination, the central system 12 can compare process data items with one another according to a set of predefined rules. In this manner, process data items collected from the same process instance can be associated with one another to form a set. Each set of interrelated process data items represents a process instance that executed in the distributed computer system 10. Once a set of interrelated process data items has been determined, the process execution described by that set can be reconstructed.

Each process data item can include a time stamp, which indicates the time and date at which the process data item was collected. A process data item can also include one or more of an identifier identifying the agent that collected the process data item, an identifier indicating the configuration of the agent that collected the process data item, and an application specific data field. In one implementation, the central system arranges the process data items associated with the process instance being reconstructed in chronological order and displays them to the user. In another implementation, the process data items are interpreted by a user interface that allows the user to define how the process data items associated with the process instance being reconstructed are to be displayed.

As described above, reconstruction can occur at any point after process execution begins, but only process data items that have been transferred to the central system 12 will be available. Each process data item generally represents an instant in time during the execution of the process. Therefore, someone observing the reconstructed process instance will see the execution as it occurred previously. The level of detail of the reconstructed process instance will vary with the quality and quantity of process data items collected during execution of the process instance.

Figure 9:
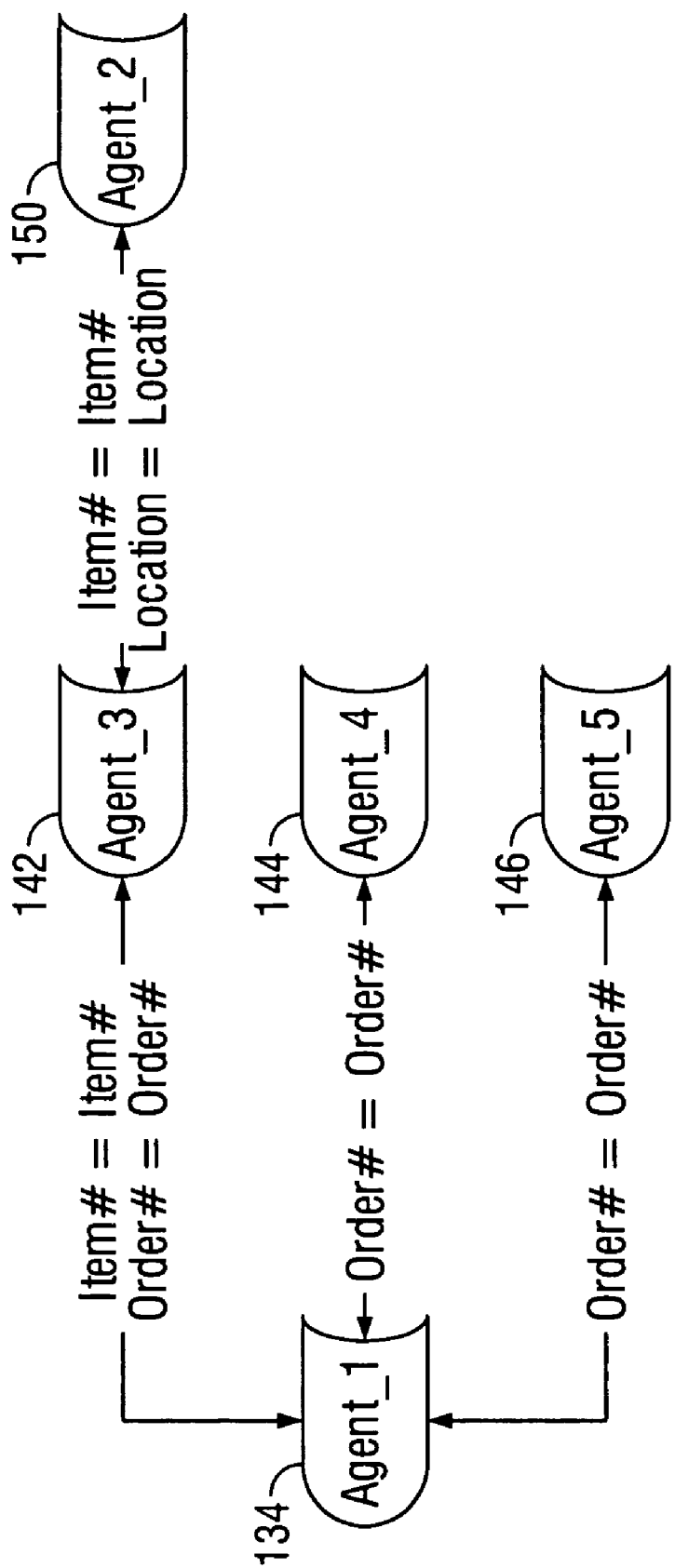
FIG. 9 is a data flow diagram showing a rule set used at a central system.

FIG. 9 provides an example of the set of predefined rules the central system 12 can use to compare and associate the process data items. In FIG. 9, a process data item collected by Agent_1 134 corresponds to a process data item collected by Agent_4 144 if the process data items share the same order number. That is, process data items collected by Agent_1 134 and Agent_4 144 belong to the same process instance if the order numbers in the process data items match. Similarly, the process data items collected by Agent_1 134 and Agent_3 142 belong to the same process instance if both the item numbers and the order numbers in the process data items match.

In some instances, process data items collected by different agents may not share a common identifier. However, the central system 12 can still determine whether the process data items are associated with the same process instance as long as an indirect connection between the process data items may be established. For example, in FIG. 9, there is no direct connection between the process data items collected by Agent_1 134 and Agent_2 150. However, as described above, process data items collected by Agent_1 134 and Agent_3 142 are associated with the same process instance if the process data items share the same item number and order number. Further, the process data items collected by Agent_2 150 and Agent_3 142 are associated with the same process instance if the process data items share the same item number and location. Therefore, an indirect connection may be established between the process data items collected by Agent_1 134 and Agent_2 150 in order to determine whether the process data items are associated with the same process instance.

Figure 10:
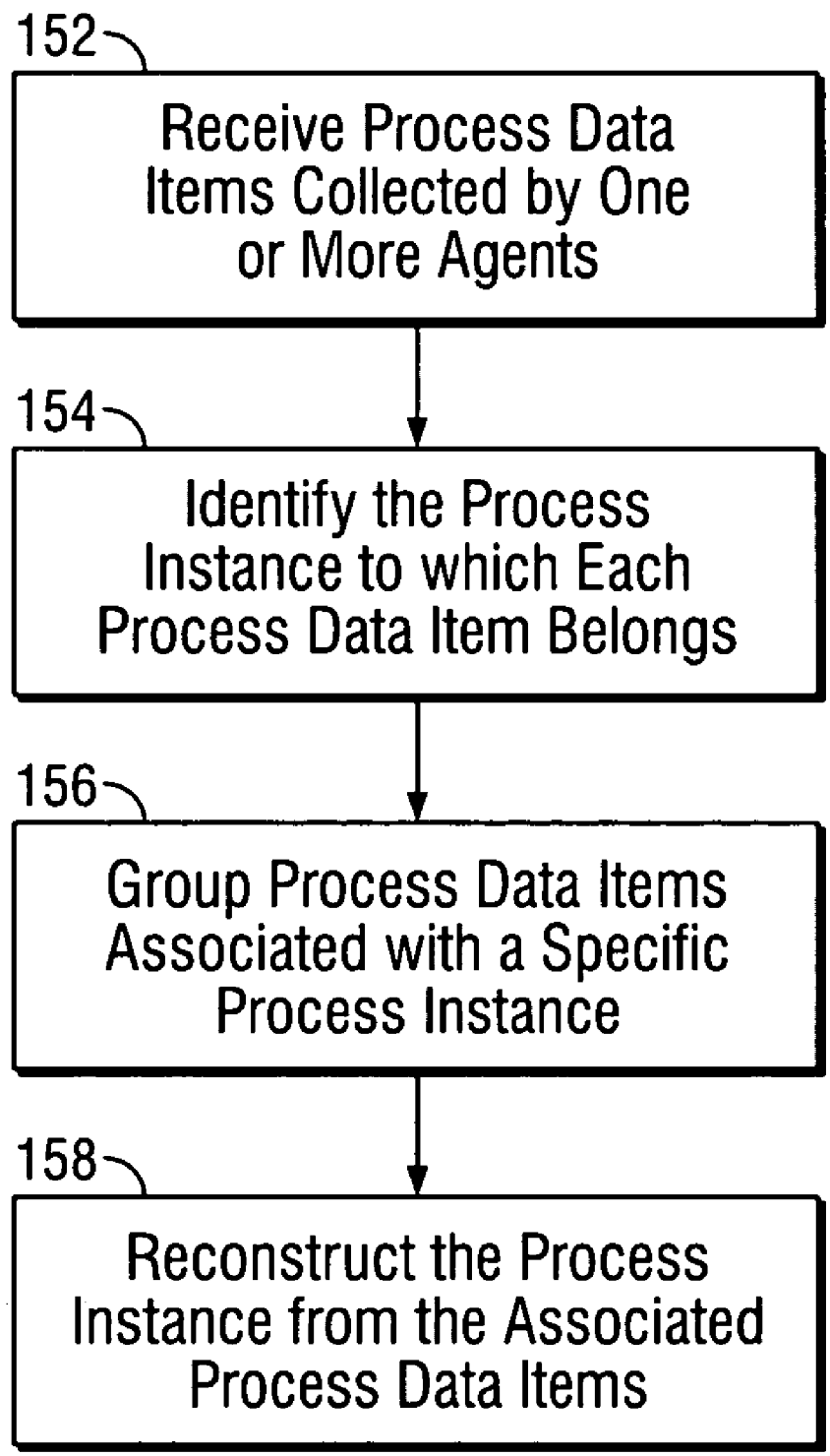
FIG. 10 shows a flowchart for discovering and monitoring process executions in distributed computer systems using agents.

FIG. 10 describes the method of reconstructing a process instance using process data items. In a first step 152, as describe above, the process data items collected by one or more agents operating in the distributed computer system 10 are received into the central system 12. In a second step 154, the process data items in the central system 12 are compared with one another according to a set of predefined rules, as described in FIG. 9. Based upon this comparison, each process data item is associated with a process instance. Once all of the process data items have been associated with a process instance, the third step 156 is to group the process data items according to their respective process instance. This step does not require a physical grouping. The individual process data items may be logically linked to a process instance using an identifier, a pointer, or any other known means. In the fourth step 158, a process instance is reconstructed from all of the process data items that have been associated with that process instance.

Thus far, the discovery and monitoring of process executions in a distributed computer system 10 has been described in terms of agents collecting process data items during process execution. However, agents may also be used to collect process data items after process execution has terminated. During the execution of a process instance, process data may be stored on a file system or in a database. Once the execution of one or more process instances has terminated, the agents can read the process data stored during execution and collect process data items therefrom. The transfer of process data items to the central system 12 and reconstruction of process instances can occur as described above. Agents can be used to collect process data items in this manner instead of collecting process data items during process execution. Alternatively, agents may be used to collect process data items both during process execution and after process execution.

A reconstructed process instance can be used to monitor and analyze that process instance during execution and after execution has terminated. For example, the reconstructed process instance can be used to determine whether the process instance executed successfully, where and when errors occurred, what resources were involved in the execution, or what portion of the process instance has executed. Further, if the transfer of process data items from an agent to the central system 12 occurs very close in time to collection, it is possible to monitor the execution of a process instance in near-real-time.

Once multiple instances of a process have been reconstructed, those instances may be compared or combined to provide information about a process. For example, multiple reconstructed instances of a process can be used to model a process. Each reconstructed process instance generally shows a single path of execution through the process. However, given a large enough number of reconstructed process instances, it is possible to develop a process context showing many of the possible execution paths through the process. Multiple reconstructed process instances are also valuable for analyzing trends in the execution of a process and optimizing process flow. Such uses are only examples, and many additional uses exist for a single reconstructed process instance and multiple reconstructed instances of a process.

The invention can be implemented in digital electronic circuitry, or in computer hardware, firmware, software, or in combinations of them. The invention can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

The invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results.

What is claimed is:

1. A computer program product, tangibly embodied in a machine readable storage device, the computer program product comprising instructions operable to cause data processing apparatus to perform operations comprising:
   receiving a plurality of process data items associated with a plurality of process instances that are executed using a plurality of components operating in a distributed computer system, each process data item comprising a plurality of application data and having been collected by each agent of a plurality of agents, wherein the plurality of components includes a first set of components that execute a first process instance and a second set of components that execute a second process instance with at least one of the plurality of components included in each of the first and second sets of components, a first agent collecting a first process data item of a first type corresponding to a first attribute and a second attribute, and a second agent collecting a second process data item of a second type corresponding to the first attribute and the second attribute, the first type being different from the second type;
   comparing in accordance with a plurality of predefined rules each received process data item with one or more other received process data items to identify process data corresponding to process instances executed on the distributed computer system, the predefined rules comprising:
      identifying the first and second process data items as belonging to a common process instance when a value of the first attribute is equal for both the first and second process data items,
      identifying the first and second process data items as belonging to a common process instance when values of the first and second attributes are equal for both the first and second process data items, and
      identifying the first process data item and a third process data item collected by a third agent as belonging to a common process instance when the first and second process data items belong to a common process instance and the second and third process data items belong to a common process instance;
   grouping into a first group a plurality of process data items corresponding to the first process instance, the first process instance being a single execution of a first sequence of related steps carried out in the distributed computer system;
   grouping into a second group a plurality of process data items corresponding to the second process instance, the second process instance being a single execution of a second sequence of related steps carried out in the distributed computer system; and
   reconstructing the first and second process instances based on the process data items in the first and second groups, respectively.

2. The computer program product of claim 1, wherein the operations further comprise:
   modeling a process based on the reconstruction of the first process instance.

3. The computer program product of claim 1, wherein the plurality of process data items includes a first type of process data item and a different, second type of process data item that are each collected by a common agent upon occurrence of a common predetermined condition.

4. The computer program product of claim 1, wherein the operations further comprise:
   identifying a tracking point associated with a component of the first set of components; and
   associating an agent of the first set of agents with the component.

5. The computer program product of claim 1, wherein the operations further comprise assigning an identifier to each agent, the identifier being unique within the distributed computer system.

6. The computer program product of claim 5, wherein the unique identifier enables a central system of the distributed computer system to locate and communicate with a particular agent.

7. The computer program product of claim 1, wherein the operations further comprise associating an agent with an interface point of a component, the interface point being used for component communication within the distributed system.

8. A computer program product, tangibly embodied in machine readable storage device, the computer program product comprising instructions operable to cause data processing apparatus to perform operations comprising:

receiving a specification of a predetermined condition;

upon the occurrence of the predetermined condition, using agents to collect a plurality of process data items associated with a plurality of components operating in a distributed computer system, wherein the plurality of components includes a first set of components that execute a first process instance and a second set of components that execute a second process instance with at least one of the plurality of components included in each of the first and second sets of components, a first agent collecting a first process data item of a first type corresponding to a first attribute and a second attribute, and a second agent collecting a second process data item of a second type corresponding to the first attribute and the second attribute, the first type being different from the second type; and transferring the process data items to a central system operable to discover and reconstruct the first and second process instances based on common application data found in the process data items, the first and second process instances each being a single execution of a sequence of related steps carried out in the distributed computer system, the discovering comprising:

identifying the first and second process data items as belonging to a common process instance when a value of the first attribute is equal for both the first and second process data items, identifying the first and second process data items as belonging to a common process instance when values of the first and second attributes are equal for both the first and second process data items, and identifying the first process data item and a third process data item collected by a third agent as belonging to a common process instance when the first and second process data items belong to a common process instance and the second and third process data items belong to a common process instance.

9. The computer program product of claim 8, wherein the operation of collecting the process data items occurs without modifying components of the plurality of components.

10. The computer program product of claim 8, wherein the operations further comprise:

receiving a specification of a second predetermined condition; and upon the occurrence of the second predetermined condition, collecting additional process data items associated with a component.

11. The computer program product of claim 8, wherein the operations further comprise:

receiving a specification of a second component;

upon the occurrence of another predetermined condition, collecting other process data items associated with the second component; and transferring the other process data items to the central system.

12. The computer program product of claim 8, wherein the plurality of process data items includes a first type of process data item and a different, second type of process data item that are each collected by a common agent upon occurrence of a common predetermined condition.

13. A method of monitoring an autonomous sequence of related steps, executed using a plurality of components operating in a distributed computer system specifying a process, the method comprising:

collecting a plurality of process data items associated with a plurality of components operating in a distributed computer system, wherein the plurality of components includes a first set of components that execute a first process instance and a second set of components that execute a second process instance with at least one of the plurality of components included in each of the first and second sets of components, a first agent collecting a first process data item of a first type corresponding to a first attribute and a second attribute, and a second agent collecting a second process data item of a second type corresponding to the first attribute and the second attribute, the first type being different from the second type;

transferring the process data items from the agents to a central system;

comparing in accordance with a plurality of predefined rules each transferred process data item with one or more other transferred process data items to identify process data corresponding to process instances executed on the distributed computer system, the predefined rules comprising:

identifying the first and second process data items as belonging to a common process instance when a value of the first attribute is equal for both the first and second process data items, identifying the first and second process data items as belonging to a common process instance when values of the first and second attributes are equal for both the first and second process data items, and identifying the first process data item and a third process data item collected by a third agent as belonging to a common process instance when the first and second process data items belong to a common process instance and the second and third process data items belong to a common process instance;

grouping into a first group in the central system a plurality of process data items corresponding to the first process instance, the first process instance being a single execution of a sequence of related steps carried out in the distributed computer system;

grouping into a second group a plurality of process data items corresponding to the second process instance, the second process instance being a single execution of a second sequence of related steps carried out in the distributed computer system; and reconstructing the first and second process instances based on the process data items in the first and second groups, respectively.

14. The method of claim 13, wherein the plurality of process data items includes a first type of process data item and a different, second type of process data item that are each collected by a common agent upon occurrence of a common predetermined condition.

15. A method of monitoring an autonomous sequence of related steps, executed using a plurality of components operating in a distributed computer system specifying a process, the method comprising:

receiving a plurality of process data items associated with a plurality of components operating in a distributed computer system, each process data item comprising application data and having been collected by agents, wherein the plurality of components includes a first set of components that execute a first process instance and a second set of components that execute a second process instance with at least one of the plurality of components included in each of the first and second sets of components, a first agent collecting a first process data item of a first type corresponding to a first attribute and a second attribute, and a second agent collecting a second process data item of a second type corresponding to the first attribute and the second attribute, the first type being different from the second type;

comparing in accordance with a plurality of predefined rules each received process data item with one or more other received process data items to identify common application data, the predefined rules comprising:
  identifying the first and second process data items as belonging to a common process instance when a value of the first attribute is equal for both the first and second process data items,
  identifying the first and second process data items as belonging to a common process instance when values of the first and second attributes are equal for both the first and second process data items, and
  identifying the first process data item and a third process data item collected by a third agent as belonging to a common process instance when the first and second process data items belong to a common process instance and the second and third process data items belong to a common process instance;

grouping into a first group a plurality of process data items having common application data that corresponds to the first process instance, the first process instance being a single execution of a sequence of related steps carried out in the distributed computer system;

grouping into a second group a plurality of process data items having common application data that corresponds to the second process instance, the second process instance being a single execution of a second sequence of related steps carried out in the distributed computer system; and reconstructing the first and second process instances based on the process data items in the first and second groups, respectively.

16. The method of claim 15, wherein the method further comprises:
modeling a process based on the reconstruction of the first process instance.

17. The method of claim 15, wherein the method further comprises:
monitoring the first process instance based on the process data items in the first group.

18. The method of claim 15, wherein the plurality of process data items includes a first type of process data item and a different, second type of process data item that are each collected by a common agent upon occurrence of a common predetermined condition.

19. A method of monitoring an autonomous sequence of related steps, executed using a plurality of components operating in a distributed computer system specifying a process, the method comprising:

executing one or more process instances on a distributed computer system comprising a plurality of computers;

receiving a specification of a predetermined condition;

upon the occurrence of the predetermined condition, using agents to collect a plurality of process data items associated with components operating in the distributed computer system, wherein the plurality of components includes a first set of components that execute a first process instance and a second set of components that execute a second process instance with at least one of the plurality of components included in each of the first and second sets of components, a first agent collecting a first process data item of a first type corresponding to a first attribute and a second attribute, and a second agent collecting a second process data item of a second type corresponding to the first attribute and the second attribute, the first type being different from the second type; and transferring the process data items to a central system operable to discover and reconstruct the first and second process instances based on common application data found in the process data items, the first and second process instances each being a single execution of a sequence of related steps carried out in the distributed computer system, the discovering comprising:
  identifying the first and second process data items as belonging to a common process instance when a value of the first attribute is equal for both the first and second process data items,
  identifying the first and second process data items as belonging to a common process instance when values of the first and second attributes are equal for both the first and second process data items, and
  identifying the first process data item and a third process data item collected by a third agent as belonging to a common process instance when the first and second process data items belong to a common process instance and the second and third process data items belong to a common process instance.

20. The method of claim 19, wherein the plurality of process data items includes a first type of process data item and a different, second type of process data item that are each collected by a common agent upon occurrence of a common predetermined condition.

21. A system for monitoring an autonomous sequence of related steps, executed using a plurality of components operating in a distributed computer system specifying a process, the system comprising:

a plurality of computers that communicate with one another over one or more communications channels to define a distributed computer system;

means for receiving a specification of a predetermined condition at one or more computers of the plurality of computers;

agents for, upon the occurrence of the predetermined condition, collecting a plurality of process data items associated with a plurality of components operating in the distributed computer system, wherein the plurality of components includes a first set of components that execute a first process instance and a second set of components that execute a second process instance with at least one of the plurality of components included in each of the first and second sets of components, a first agent collecting a first process data item of a first type corresponding to a first attribute and a second attribute, and a second agent collecting a second process data item of a second type corresponding to the first attribute and the second attribute, the first type being different from the second type; and means for transferring the process data items to a central system operable to discover and reconstruct the first and second process instances based on common application data found in the process data items, the first and second process instances each being a single execution of a sequence of related steps carried out in the distributed computer system, the discovering comprising:

identifying the first and second process data items as belonging to a common process instance when a value of the first attribute is equal for both the first and second process data items, identifying the first and second process data items as belonging to a common process instance when values of the first and second attributes are equal for both the first and second process data items, and identifying the first process data item and a third process data item collected by a third agent as belonging to a common process instance when the first and second process data items belong to a common process instance and the second and third process data items belong to a common process instance.

22. The system of claim 21, wherein the plurality of process data items includes a first type of process data item and a different, second type of process data item that are each collected by a common agent upon occurrence of a common predetermined condition.

* * * * *